US009547175B2

(12) United States Patent
Farzbod et al.

(10) Patent No.: US 9,547,175 B2
(45) Date of Patent: Jan. 17, 2017

(54) ADAPTIVE PIEZOELECTRIC ARRAY FOR BONE CONDUCTION RECEIVER IN WEARABLE COMPUTERS

(71) Applicant: Google Inc., Mountain View, CA (US)

(72) Inventors: Farhad Farzbod, Mountain View, CA (US); Jianchun Dong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 14/218,639

(22) Filed: Mar. 18, 2014

(65) Prior Publication Data

US 2015/0268673 A1    Sep. 24, 2015

(51) Int. Cl.
*G01N 11/00*   (2006.01)
*G01B 5/00*   (2006.01)
*H04R 25/00*   (2006.01)
*G02B 27/01*   (2006.01)
*H04R 1/02*   (2006.01)
*H04R 5/033*   (2006.01)
*H04R 17/00*   (2006.01)

(52) U.S. Cl.
CPC ........... *G02B 27/0176* (2013.01); *H04R 1/028* (2013.01); *H04R 5/033* (2013.01); *H04R 17/00* (2013.01); *G02B 2027/0138* (2013.01); *G02B 2027/0178* (2013.01); *G02B 2027/0187* (2013.01)

(58) Field of Classification Search
CPC .................. G02B 2027/0178; G02B 27/0176; G02B 2027/0187; G02B 2027/0138; H04R 1/028; H04R 5/033; H04R 17/00; H04R 2460/13
USPC . 702/33, 41, 44, 56; 351/114, 158; 381/151, 333
See application file for complete search history.

(56) References Cited

U.S. PATENT DOCUMENTS

| 5,879,283 A | 3/1999 | Adams et al. |
| 6,349,001 B1 | 2/2002 | Spitzer |
| 7,117,743 B2 | 10/2006 | Blakley |
| 7,499,686 B2 | 3/2009 | Sinclair et al. |
| 2010/0110368 A1 | 5/2010 | Chaum |

(Continued)

FOREIGN PATENT DOCUMENTS

WO     2013136137      9/2013

OTHER PUBLICATIONS

International Search Report for corresponding PCT application No. PCT/US2015/021214, dated Jun. 25, 2015.

(Continued)

*Primary Examiner* — An Do
(74) *Attorney, Agent, or Firm* — McDonnell Boehnen Hulbert & Berghoff LLP

(57) ABSTRACT

Example embodiments may relate to methods and systems for adapting an array of piezoelectric transducers, placed on a head-mounted device (HMD), to different head sizes. For example, an HMD (e.g., a wearable computer) may include an array of transducers that are configured to operate as bone conduction transducers (BCTs), and alternatively as pressure sensors. In particular, methods and systems may be implemented to determine a respective power level for each vibration transducer in the array based at least in part on a determined mechanical load on each transducer in the array. Once the respective power level for each vibration transducer is determined, the system may cause each vibration transducer in the array to operate at the determined respective power level.

20 Claims, 13 Drawing Sheets

(56) References Cited

U.S. PATENT DOCUMENTS

2012/0254244 A1* 10/2012 Vetek ................ G06K 9/00315
                                                                                                     707/780
2013/0022220 A1    1/2013  Dong et al.
2013/0246059 A1    9/2013  Kechichian et al.
2014/0064536 A1    3/2014  Kim et al.

OTHER PUBLICATIONS

Pressure Profile Systems, Inc., "TactileHead Pressure Measurement", http://www.pressureprofile.com/case-study-tactilehead.php (2013).

* cited by examiner

ADAPTIVE PIEZOELECTRIC ARRAY FOR BONE CONDUCTION RECEIVER IN WEARABLE COMPUTERS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A head-mounted device (HMD), such as a wearable computer, may include an array of piezoelectric transducers that are configured to operate as bone conduction transducers (BCTs), and alternatively as pressure sensors. A BCT is designed to conduct sound to the inner ear through the bones of the skull, and thus benefits from good contact with a user's head. However, due to the varying sizes and shapes of human heads, some transducers within the array may end up with partial contact or no contact with the wearer's head. Therefore, a system may be desirable for allocating energy throughout the array based on a quality of contact that each transducer in the array has with a user's head.

In one aspect, a head-mountable device is provided. The head-mountable device includes an array of vibration transducers arranged on a support structure of the head-mountable device, where one or more of the vibration transducers from the array are each configured to sense mechanical load on the vibration transducer. The head-mountable device also includes at least one amplifier configured to transmit power to the array of vibration transducers. The head-mountable device further includes a control system configured to perform functions. The functions include determining a respective mechanical load on each of the one or more vibration transducers that are configured to sense mechanical load. The functions also include, based at least in part on the one or more determined mechanical loads, determining a respective power level for each vibration transducer in the array.

In another aspect, a method is provided. The method involves determining a respective mechanical load on each of one or more vibration transducers from an array of vibration transducers that is arranged on a support structure of a head-mountable device, where the one or more of the vibration transducers from the array are each configured to sense mechanical load on the vibration transducer, and where the head-mountable device comprises at least one amplifier configured to transmit power to the array of vibration transducers. The method also involved, based at least in part on the one or more determined mechanical loads, determining a respective power level for each vibration transducer in the array.

In yet another aspect, a non-transitory computer readable medium is provided. The non-transitory computer readable medium has stored therein instructions executable by a computing device to cause the computing device to perform functions. The functions include determining a respective mechanical load on each of one or more vibration transducers from an array of vibration transducers that is arranged on a support structure of a head-mountable device, where the one or more of the vibration transducers from the array are each configured to sense mechanical load on the vibration transducer, and where the head-mountable device comprises at least one amplifier configured to transmit power to the array of vibration transducers. The functions also include, based at least in part on the one or more determined mechanical loads, determining a respective power level for each vibration transducer in the array.

In yet another aspect, a system is provided. The system may include: (a) means for determining a respective mechanical load on each of one or more vibration transducers from an array of vibration transducers that is arranged on a support structure of a head-mountable device, where the one or more of the vibration transducers from the array are each configured to sense mechanical load on the vibration transducer, and where the head-mountable device comprises at least one amplifier configured to transmit power to the array of vibration transducers; and (b) means for determining a respective power level for each vibration transducer in the array based at least in part on the one or more determined mechanical loads.

These as well as other aspects, advantages, and alternatives will become apparent to those of ordinary skill in the art by reading the following detailed description, with reference where appropriate to the accompanying drawings.

DETAILED DESCRIPTION

Figure 1A:
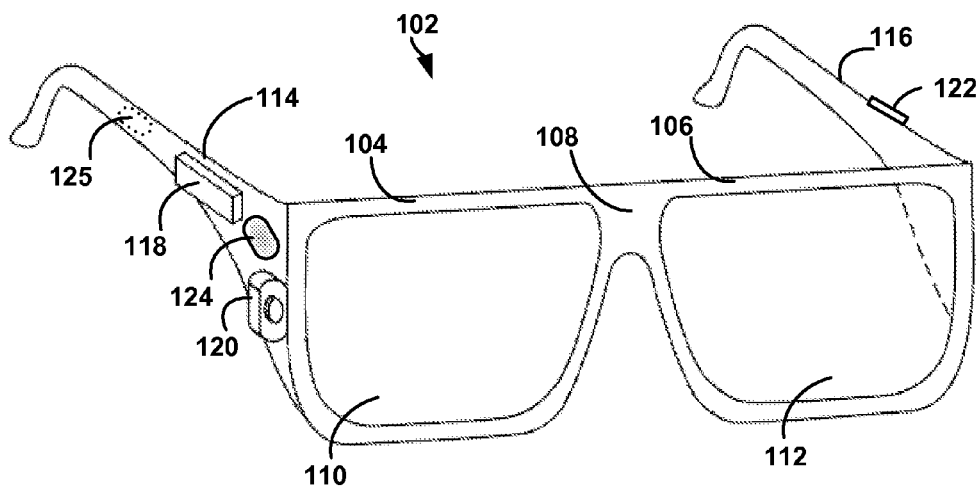
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A head-mounted device (HMD) may provide a number of applications that involve audio playback. For instance, an HMD may be configured to place phone calls, play music, and read text messages or other text to a user (e.g., using text-to-speech features), among other possibilities. As a result, it may be desirable to include a high-quality audio system in an HMD.

In an example embodiment, an audio system may include an array of bone-conduction speakers (BCTs) on a side-arm of the HMD. BCTs are designed to conduct sound to the inner ear through the bones of the skull, and thus benefit from solid contact with the user's head. As a result, BCTs may be particularly advantageous in an HMD because they can reduce (and hopefully minimize) acoustic leak to the environment. In other words, an HMD that includes a BCT may help to prevent others from hearing the audio output of the device, since it is being transmitted to the wearer's bone structure. Therefore, it is desirable for BCTs to have solid contact with a user's head, and to design the array of transducers such that each transducer in the array maintains good contact with the user's head.

However, due to the varying size and shape of the human head, some transducers within the array may end up with partial contact or no contact with the wearer's head. Therefore, a system may be desirable for allocating energy throughout the array based on a quality of contact that each transducer in the array has with a user's head. To do so, the transducers that are used in the array of BCTs may also be configured to function as pressure sensors.

More specifically, each BCT may also be configured to operate as a pressure sensor in order to help ascertain the quality of contact that the particular BCT has with the wearer's head. Provided with data from an array of such dual BCT/pressure sensors, an HMD can be configured to dynamically allocate the energy throughout the array, based on the relative amounts of pressure measured by the BCTs. For instance, a transducer with better contact with the wearer's head may receive a stronger audio signal than a transducer with partial contact, and vice versa. Further, transducers that are determined to have no contact may be deactivated.

Implementing logic in the HMD to allocate energy throughout the BCT array based on the BCT's respective quality of contact may be useful for adapting audio playback by an HMD to different head sizes. Other possible benefits of an example system may include: minimizing the acoustic leak to the environment, optimizing the use of energy allocated to the array, and making use of the sensing capabilities for additional applications, among other possibilities. However, it should be understood that the possible benefits and advantages described herein are provided for explanatory purposes, and are not to be construed as limiting the scope of the invention.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
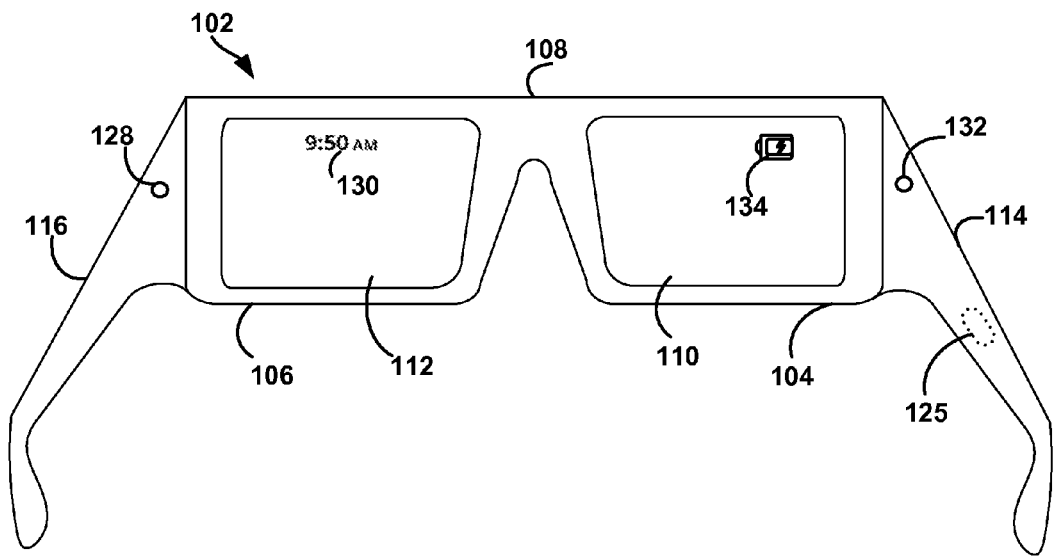
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
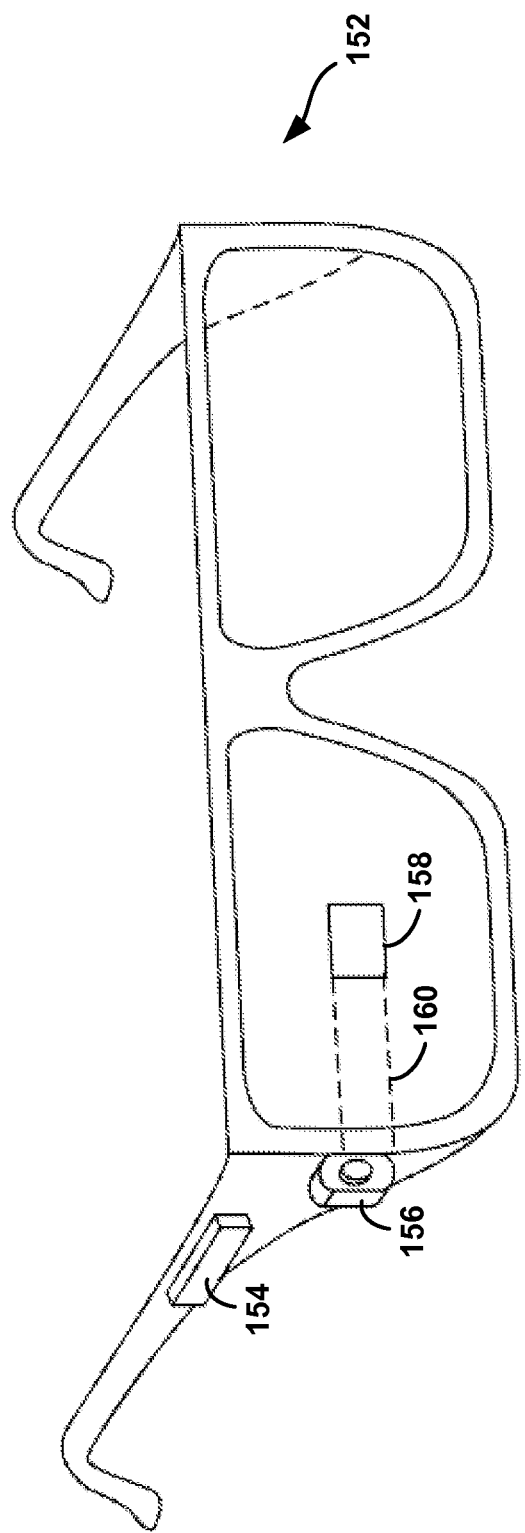
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIG. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
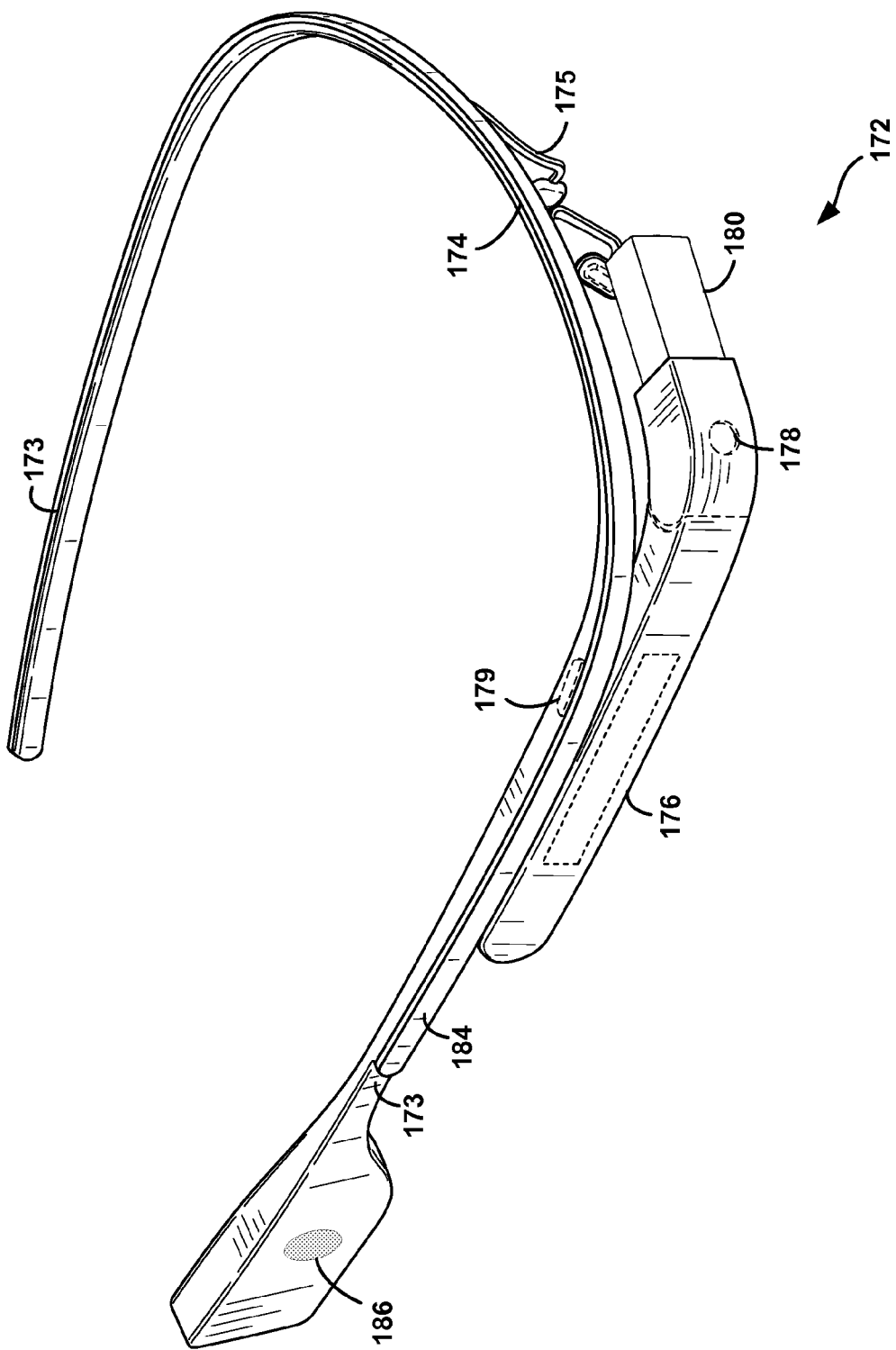
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
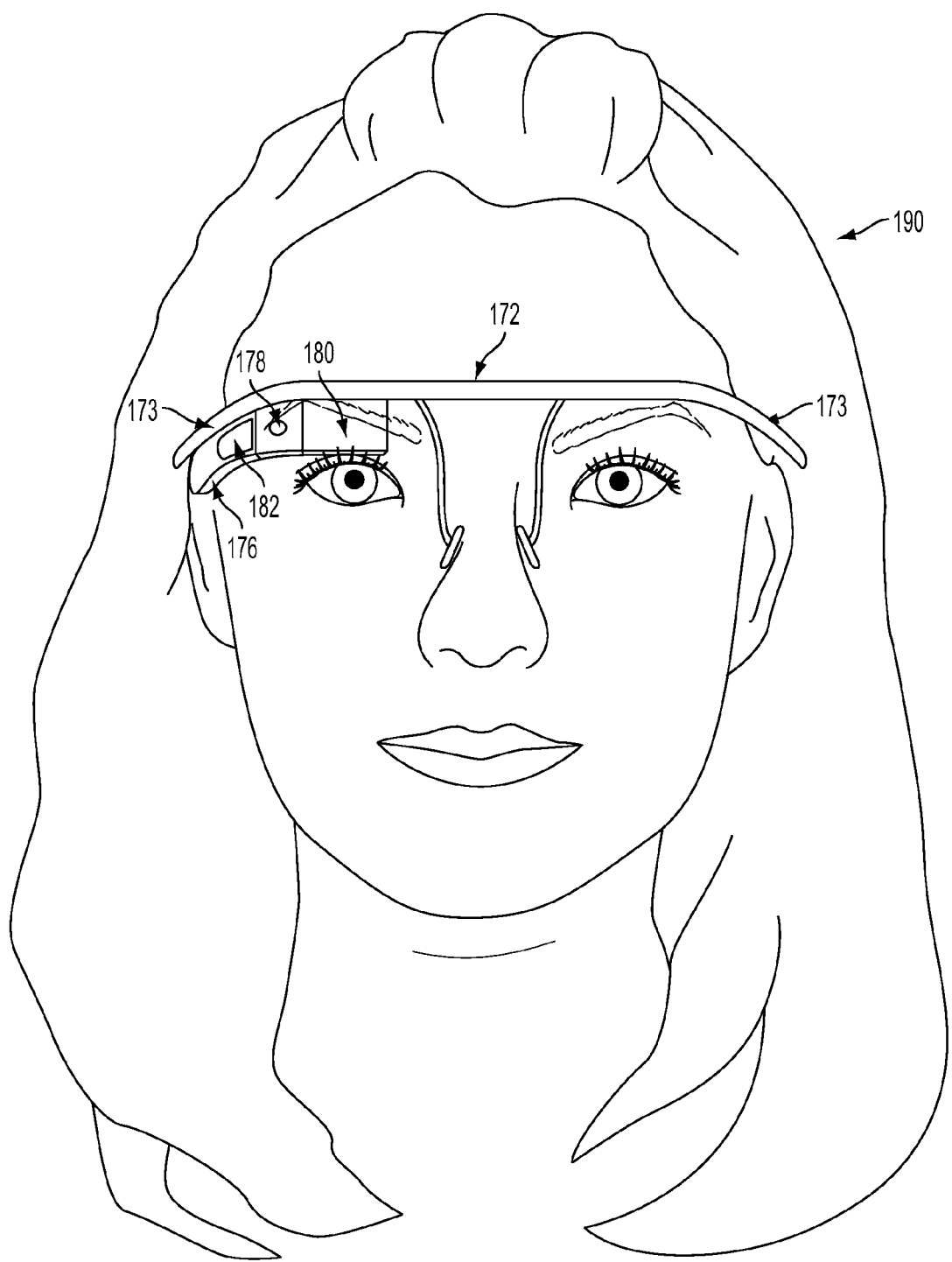
FIGS. 1E to 1G are simplified illustrations of the wearable computing system shown in FIG. 1D, being worn by a wearer.
Figure 1F:
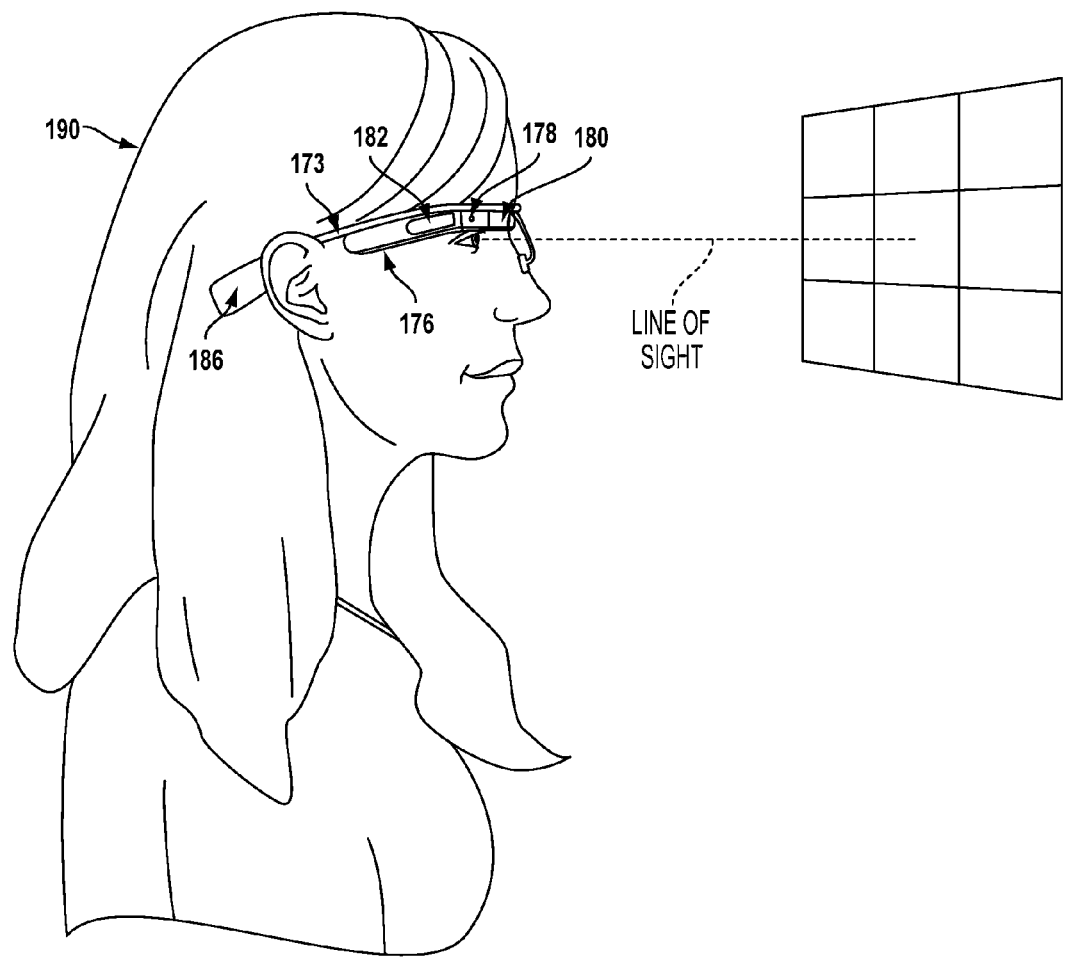
Figure 1G:
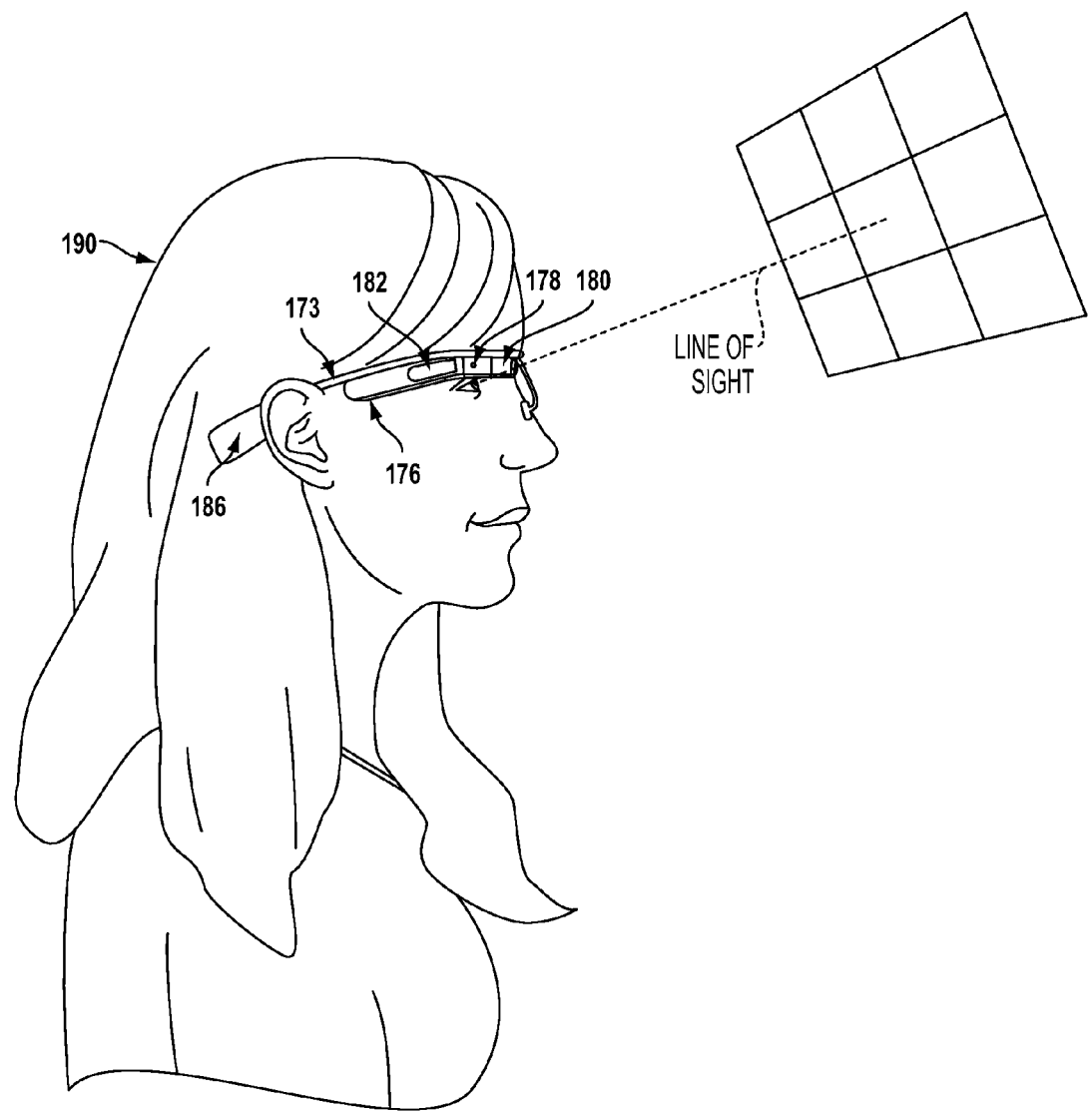

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
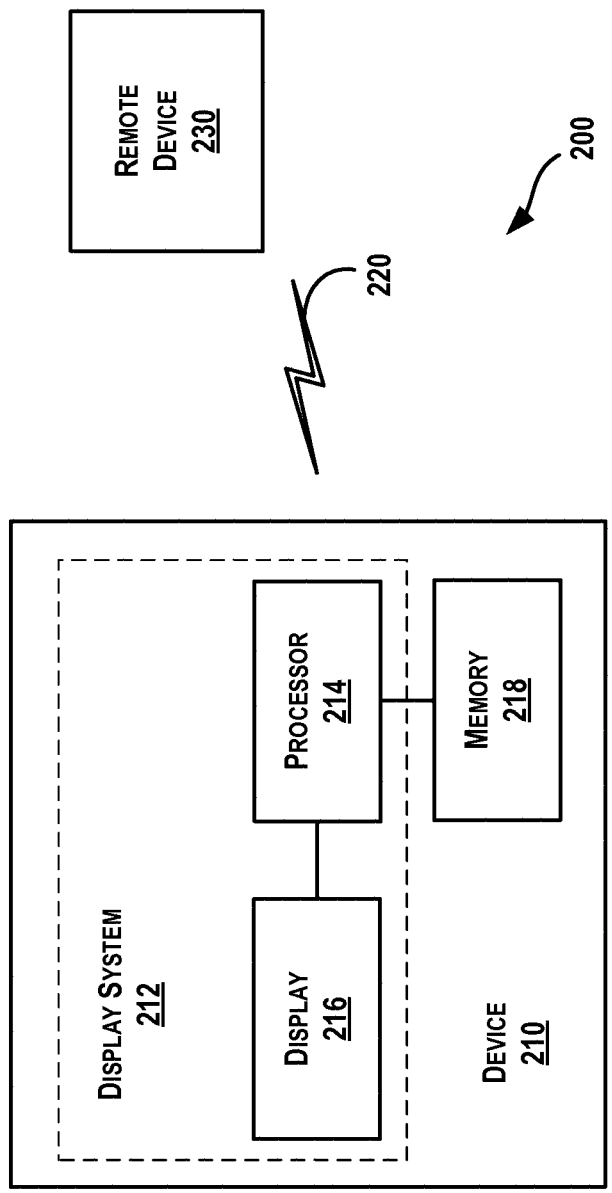
FIG. 2 is a simplified block diagram of a computing device according to an example embodiment.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Array of Vibration Transducers

Example embodiments may relate to methods and systems for adapting an array of piezoelectric transducers, placed on a head-mounted device (HMD), to different head sizes. For example, an HMD (e.g., a wearable computer) may include an array of transducers that are configured to operate as bone conduction transducers (BCTs), and alternatively as pressure sensors.

Figure 3A:
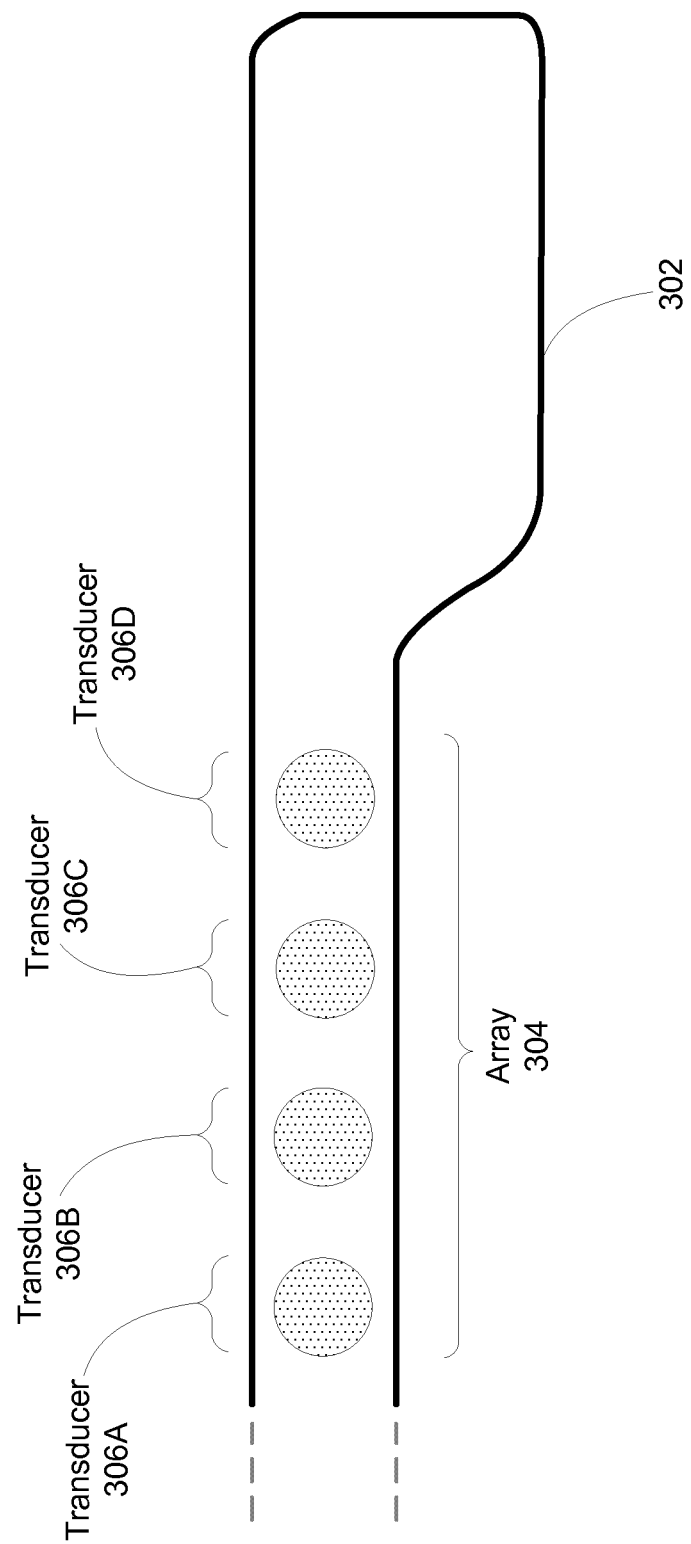
FIG. 3A is a side view of an example side-arm according to an example embodiment.

To illustrate, consider FIG. 3A showing a side view of an example side-arm 302, where the side-arm 302 is part of a support structure of the HMD. Side-arm 302 may be configured similarly to side-arms 114 and 116 as discussed above in association with FIGS. 1A and 1B, and/or similarly to side-arms 173 as discussed above in association with FIG. 1D. For instance, as illustrated in FIG. 1A, the extending side-arms 114, 116 are configured to secure the HMD 102 to a user's face via a user's nose and ears, respectively.

As shown in FIG. 3A, side-arm 302 is configured to support an array of vibration transducers 304. The array 304 may include, for example, four vibration transducers (i.e., transducers 306A-D), where each of the transducers is configured to operate as a bone conduction transducers (BCTs), and alternatively as a pressure sensor. Note that in some cases, the transducer may not be configured to operate as a pressure sensor. In this case, a pressure sensor device (not shown) may be placed adjacent to each transducer in the array 304. Other cases may also be possible.

The array 304 is shown as including four vibration transducers 306A-D. However, the array 304 may include any number of vibration transducers. In particular, the array may include at least two vibration transducers. Additionally, the vibration transducers may be arranged in any configuration along the side-arm 302.

In one case, as shown in FIG. 3A, a linear array of transducers may be positioned on the side-arm 302 of an HMD (e.g., along a side-arm such that the transducers are proximate to a wearer's bone structure, when the HMD is worn). In other words, the array may be attached to an inner wall of at least one side section (e.g., side-arm 302) of the support structure of the HMD. Note that, while the array of vibration transducers is shown as a linear array, the transducers of the array may be arranged in any manner.

In another case, both side-arms of an HMD may each include an array, such that audio can be provided separately to each ear (e.g., in stereo). In either case, the array may be positioned on any part of the side-arm(s) and/or other suitable locations on the HMD. Further, the spacing between the transducers of the array may vary. Note that using small transducers may be preferable; however, transducers of any size or type may be used.

As mentioned above, each vibration transducer from array of transducers (e.g., transducers 306A-D) may be configured to operate as a bone conduction transducer (BCT). A BCT is designed to conduct sound to the inner ear through the bones of the skull, and thus benefits from good contact with a user's head. Therefore, the vibration transducers may be arranged such that one or more of the vibration transducers vibrationally couple to a bone structure of a wearer when the HMD is worn. However, due to the varying sizes and shapes of human heads, some transducers within the array may end up with partial contact or no contact with the wearer's head.

Figure 3B:
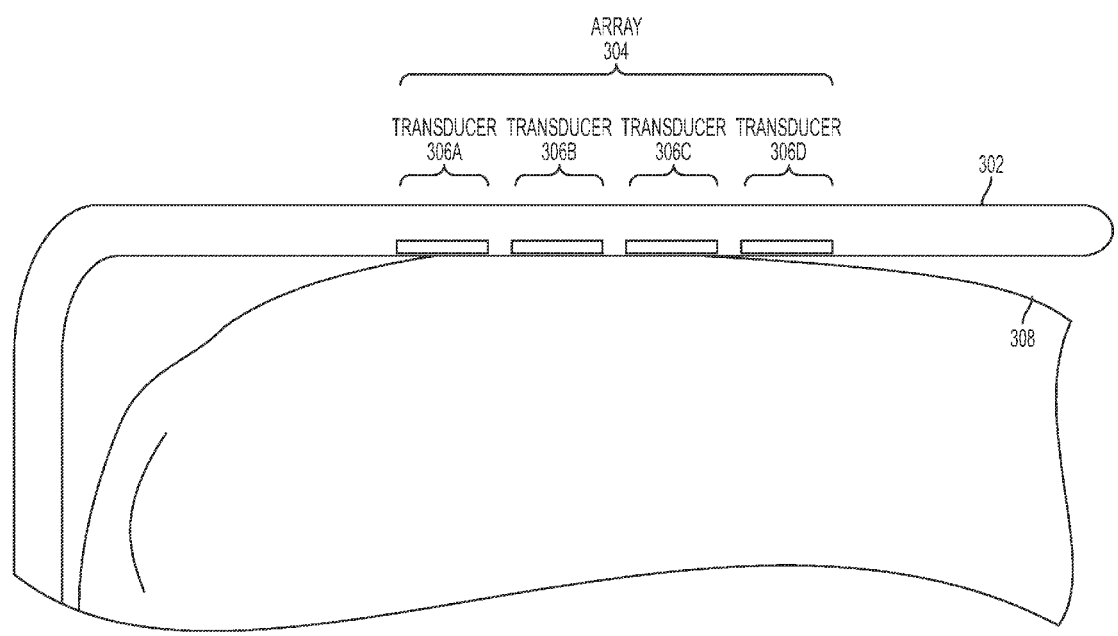
FIG. 3B is an alternate top view of the example side-arm illustrated in FIG. 3A.

To illustrate, consider FIG. 3B showing a top view of the example side-arm 302 as introduced in FIG. 3A. FIG. 3B also shows a top view of the array of vibration transducers 304 as introduced in FIG. 3A. The array 304 is shown as embedded within a frame of an HMD (e.g., within side-arm 302) and positioned such that, when the HMD is worn, array 304 vibrates a portion of the frame that contacts the wearer. However, in an example embodiment, side-arm 302 may be configured to support the array 304 in any manner. Further, FIG. 3B also shows an example bone structure 308 of a wearer of the HMD. Note that since shapes and sizes of bone structures in human heads may vary, example bone structure 308 is shown for purposes of explanation only.

As mentioned above, due to the varying sizes and shapes of human heads, some transducers within the array may end up with partial contact or no contact with the wearer's head. To illustrate, as shown in FIG. 3B, transducer 306A may be considered as having partial contact with bone structure 308. On the other hand, transducers 306B and 306C may be considered as having good contact with bone structure 308. Additionally, transducer 306D may be considered as having no contact with bone structure 308.

Figure 3C:
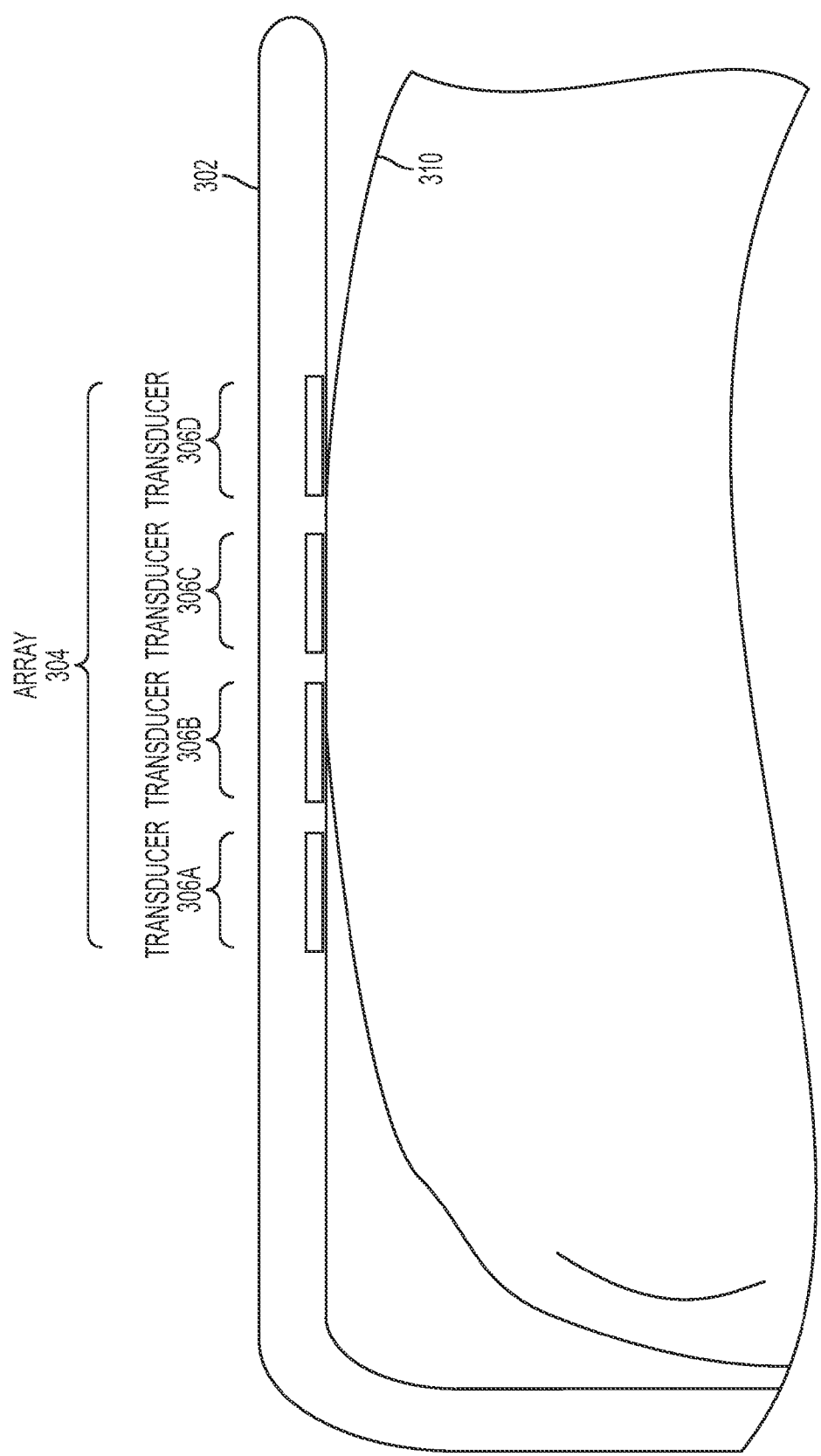
FIG. 3C is another alternate top view of the example side-arm illustrated in FIG. 3A.

Further, consider FIG. 3C showing another top view of the example side-arm 302 as introduced in FIG. 3A. In this case, a second bone structure 310 is shown for purposes of illustration. As shown in FIG. 3C, transducer 306B may be considered as having partial contact with bone structure 310. On the other hand, transducer 306C may be considered as having good contact with bone structure 308. Additionally, transducers 306A and 306D may be considered as having no contact with bone structure 308. Other examples may also be possible.

Since a BCT benefits from good contact with a user's head, it may be desirable to determine a quality of contact (e.g., partial contact, good contact, or no contact) that each transducer from the array 304 has with a wearer's head. Therefore, a transducer that is also operable as a pressure sensor may be configured to detect the quality of contact of the transducer. As such, one or more of the vibration transducers from the array may each be configured to sense a mechanical load on the vibration transducer. Consequently, the HMD may use such indications of the quality of contact provided by such dual-mode transducers to dynamically allocate energy throughout the array to those transducers with better contact and/or for other purposes.

IV. Illustrative Methods

Figure 4:
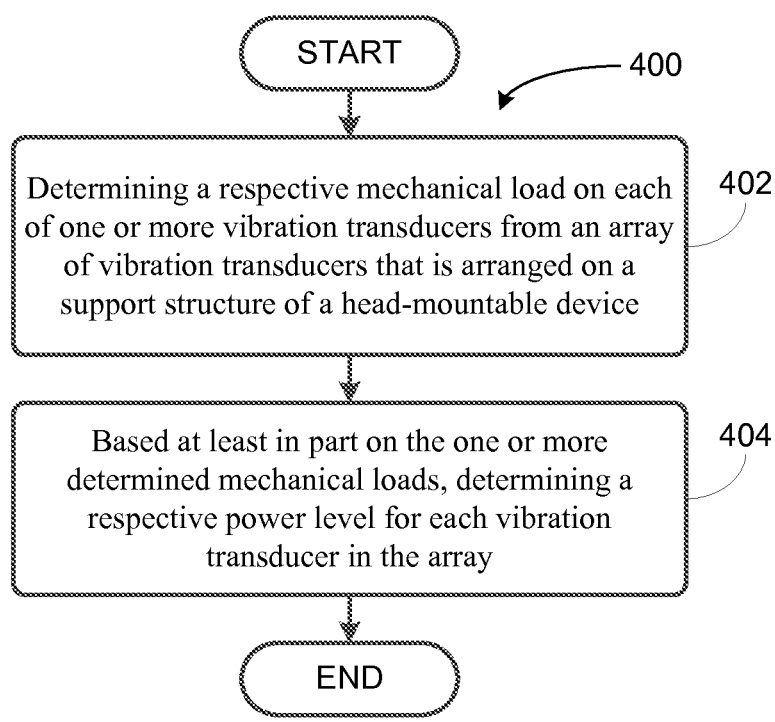
FIG. 4 shows an example flow diagram for determining a respective power level for a vibration transducer according to an example embodiment.

FIG. 4 is a flowchart illustrating a method 400, according to an example embodiment. In particular, method 400 may be implemented to determine a respective power level for each vibration transducer in the array based at least in part on a determined mechanical load on each transducer in the array.

Method 400 shown in FIG. 4 presents an embodiment of a method that can be implemented within an operating environment involving, for example, the HMD 102 of FIGS. 1A-B, HMD 152 of FIG. 1C, HMD 172 of FIG. 1D, computing device 210 of FIG. 2, and/or side-arm 302 of FIGS. 3A-B. Method 400 may include one or more operations, functions, or actions as illustrated by one or more of blocks 402-404. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 400 and other processes and methods disclosed herein, each block in FIG. 4 may represent circuitry (e.g., a control system) that is wired to perform the specific logical functions in the process.

Figure 5:
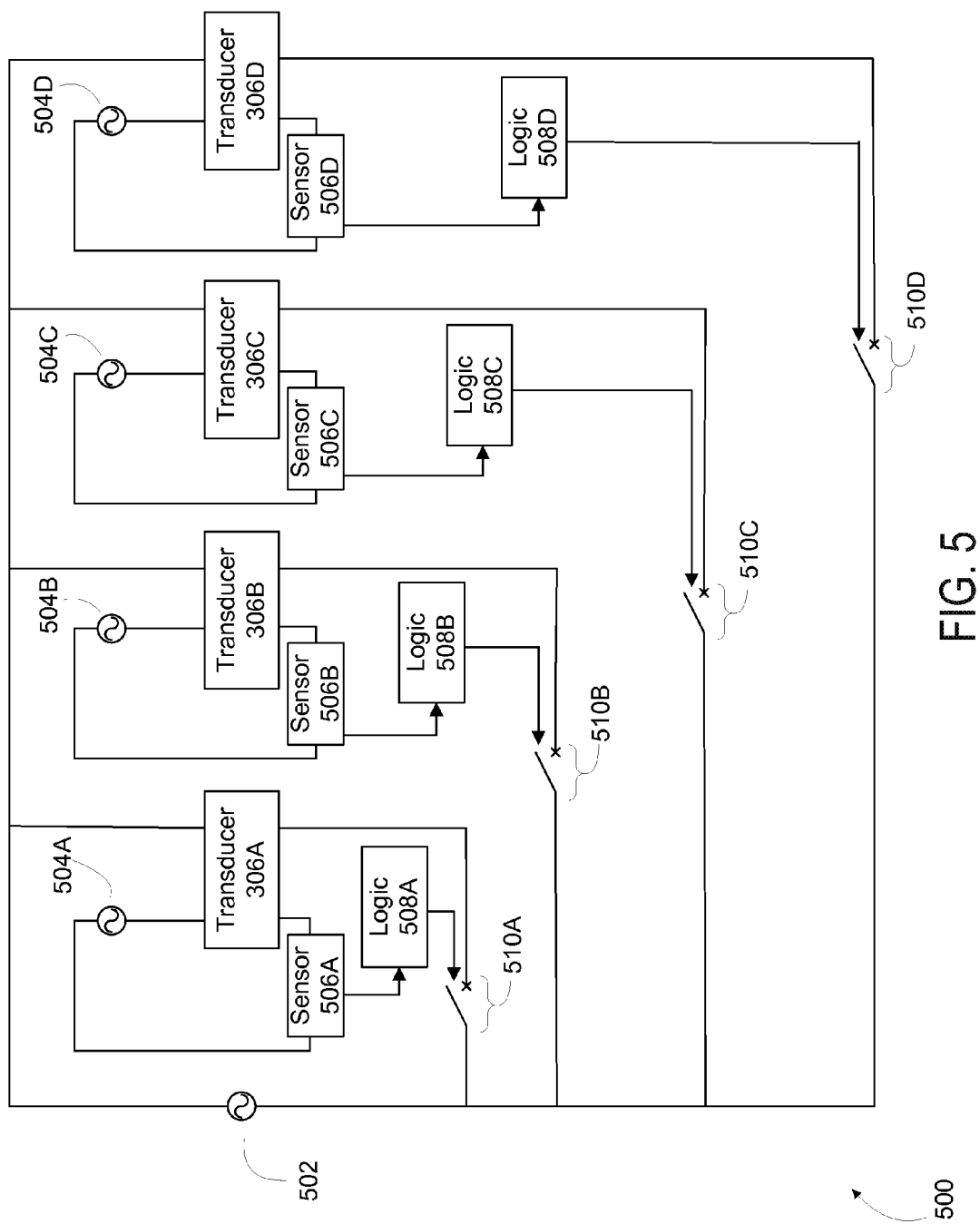
FIG. 5 shows an example system for determining a respective power level for a vibration transducer according to an example embodiment.

To help explain FIG. 4, reference is made below to FIG. 5, and therefore a brief description of FIG. 5 is now provided. FIG. 5 shows a system 500 configured to determine a respective power level for each vibration transducer in the array based at least in part on a determined mechanical load on each transducer in the array. System 500 can be implemented within an operating environment involving, for example, the HMD 102 of FIGS. 1A-B, HMD 152 of FIG. 1C, HMD 172 of FIG. 1D, computing device 210 of FIG. 2, and/or side-arm 302 of FIGS. 3A-B. In particular, system 500 includes: transducers 306A-D as introduced above in association with FIGS. 3A-B, audio signal 502, small signals 504A-D, sensors 506A-D, logic elements 508A-D, and switches 510A-D.

Audio signal 502 may involve any audio content such as an audio track, a voice interaction with the HMD, and speech generated during a phone conversation, among many other possibilities. The HMD may be configured to send the audio signal 502 to one or more of transducers 306A-D. For instance, as mentioned above in association with FIGS. 1A-B, a speaker may be a vibration transducer that produces sound in response to an electrical audio signal input. In particular, the transducers in the array may be driven by an amplifier (not shown), such as an audio power amplifier, that may be configured to amplify the audio signal 502 to a suitable level. As a result, the HMD may include at least one amplifier configured to transmit power to the array of vibration transducers.

Additionally or alternatively to the audio signal 502, small signals 504A-D may be generated to drive each transducer 306A-D, respectively. The small signals 504A-D may be used in conjunction with sensors 506A-D (e.g., current sensors) to determine a mechanical load (i.e., "sense a quality of contact") on each transducer 306A-D in the array. A detailed discussion of determining a mechanical load on each transducer is presented below in association with the discussion of method 400.

The determined mechanical load on each transducer may be recognized by a logic element. For example, logic elements 508A-D may be configured to recognize mechanical loads on transducers 306A-D, respectively. Logic elements 508A-D may be part of, for example, a control system configured to determine a respective power level for each vibration transducer in the array based at least in part on the determined mechanical load on each transducer in the array. Once the power level is determined for each transducer, the logic elements 508A-D may send signals (e.g., commands) to switches 510A-D, respectively, in order to apply an adjustment of the power level for each transducer 306A-D.

In one case, switches 510A-D may be configured similarly to a rheostat. A rheostat is an adjustable resistor (e.g., a potentiometer) used to regulate an electric current by increasing or decreasing the resistance of a circuit. In other words, switches 510A-D may be configured to increase or decrease the power flow into each transducer 306A-D, respectively, in order to achieve the determined respective power level for each transducer.

In another case, switches 510A-D may be configured similarly to toggle switches (e.g., on/off switches). In other words, switches 510A-D may be configured to activate or deactivate the transducers 306A-D, respectively, based at least in part the determined mechanical loads. Other cases may also be possible.

A. Determining a Respective Mechanical Load

At block 402, method 400 involves determining a respective mechanical load on each of one or more vibration transducers from an array of vibration transducers that is arranged on a support structure of a head-mountable device. The array of vibration transducers may be arranged on a support structure of a head-mountable device as described above in association with array 304 of FIGS. 3A-B. Further, various methods may be used to determine a respective mechanical load on each of one or more vibration transducers from an array of vibration transducers. Note that determining a mechanical load on a vibration transducer may also be referred to as "sensing" the quality of contact the transducer has with a user's head.

As mentioned above, the vibration transducers may also operate as pressure sensors. Thus, sensing a mechanical load may involve detecting a quantity of pressure on the vibration transducer. In particular, a vibration transducer may operate as a pressure sensor by producing an electrical output that is correlated with the mechanical load applied on the transducer (e.g., a quantity of pressure). Determination of the produced electrical output may come in the form of impedance monitoring, voltage monitoring, and/or current monitoring, among other possibilities. Therefore, determining a change in the electrical output may provide an indication of change in the mechanical load (e.g., quantity of pressure) placed upon the transducer, thus demonstrating a particular quality of contact. In an example embodiment, higher pressure may generally be considered an indicator of higher quality contact, and vice versa.

In one example, impedance monitoring may be used to determine (i.e., "sense") the quality of contact of a transducer. This form of monitoring may involve driving the transducer with a small inaudible signal (e.g., small signals 504A-D) at a resonant frequency of the transducer. As mentioned above, the small signals 504A-D may be embedded in addition to any audio signal 502 driving the transducer. Driving the transducer with a small inaudible signal at a resonant frequency of the transducer may allow for a determination of impedance associated with the transducer at the resonant frequency of the transducer.

Figure 6:
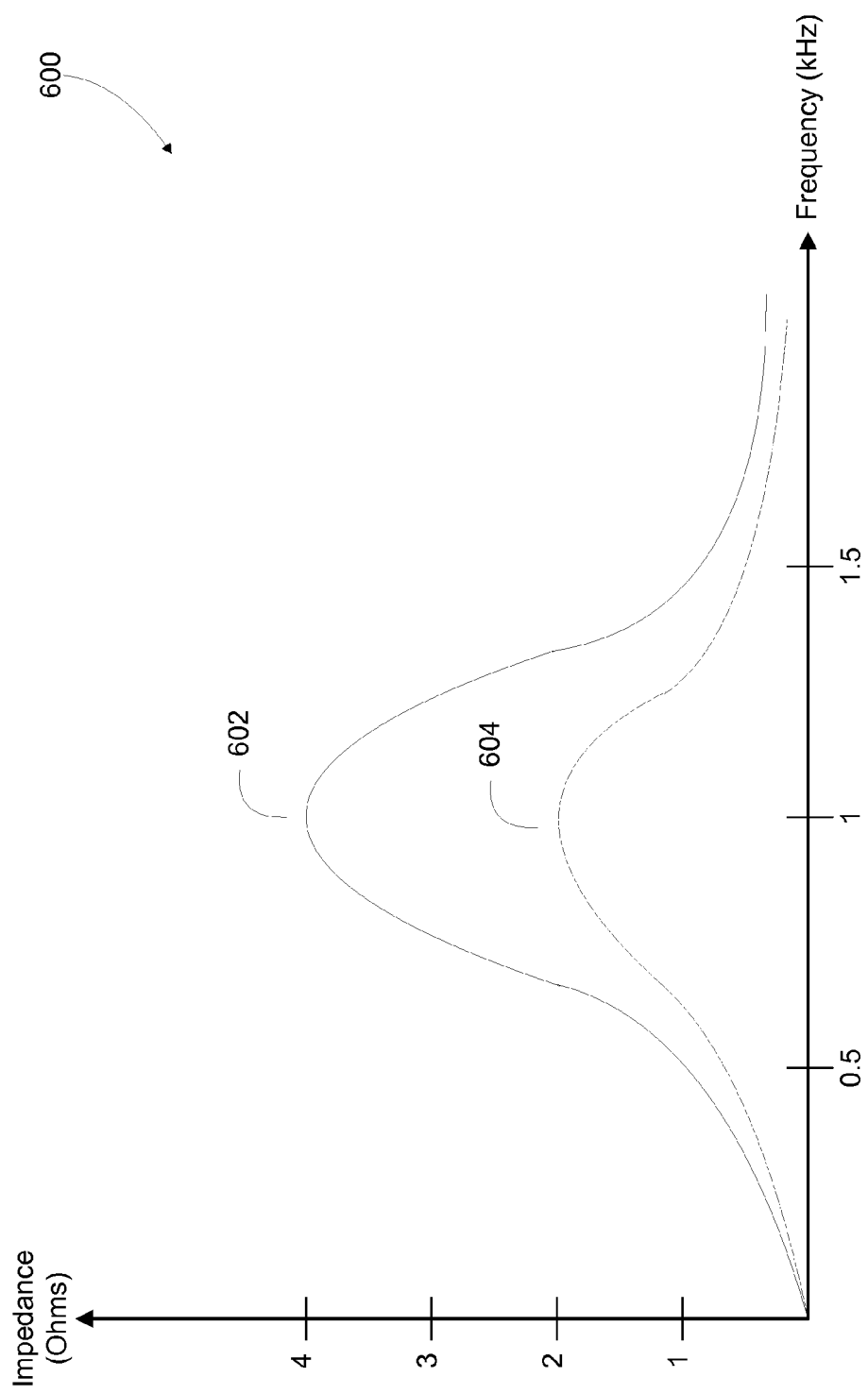
FIG. 6 shows an example graph illustrating an impedance of a transducer at a resonant frequency of the transducer.

To illustrate, consider FIG. 6 showing an example graph 600. Graph 600 includes solid line 602 and dashed line 604, each representing an example relationship between the impedance and frequency of a transducer. As demonstrated by solid line 602, when a piezoelectric transducer is "free floating" (i.e., no contact), the impedance at the resonant frequency of the transducer is high and the system is said to have a higher "Q" bandwidth. However, as demonstrated by dashed line 604, when a transducer contacts a user's head, the system may be damped (i.e., lower "Q" bandwidth) and the impedance at the resonant frequency drops as a mechanical load is applied. In other words, the impedance at the resonant frequency may decrease as the mechanical load increases.

For example, solid line 602 shows an impedance of 4 ohms at a resonant frequency of 1 kHz. An impedance of 4 ohms at the resonant frequency may be considered, for example, as the highest possible impedance, and thus the transducer may be considered as having no mechanical load. On the other hand, dashed line 604 shows an impedance of 2 ohms at aresonant frequency of 1 kHz, thus demonstrating that some mechanical load is applied to the transducer. In another example (not shown), a line on graph 600 may show an impedance of 1 ohm at a resonant frequency of 1 kHz, thus demonstrating a higher mechanical load on the transducer than demonstrated by dashed line 604. Other examples may also be possible.

As mentioned above, determination of the produced electrical output may come in the form of impedance monitoring, voltage monitoring, and/or current monitoring, among other possibilities. For instance, it may be desirable to monitor the impedance, as shown in FIG. 6, of each transducer at the resonant frequency of the transducer. In some cases, monitoring current, voltage, and/or impedance may involve measurements across the transducers by a logic element (e.g., logic elements 508A-D). However, in an example embodiment, sensors (e.g., sensors 506A-D) such as current sensors, voltage sensors, and/or impedance sensors may be connected to the transducers 306A-D for purposes of monitoring, by logic elements 508A-D, the electrical output produced by the transducers.

For example, resistors may be connected in series and/or in parallel to the transducers 306A-D. As a result, monitoring current, voltage, and/or impedance may involve measurements, by logic elements 508A-D, across the resistor(s) rather than directly across the transducers. A logic element may then use the measurements to "sense" a change in the electrical output caused by a mechanical load on a transducer. Any other combination of electrical components and logic may also be used for sensing.

FIG. 5 shows an example system configuration for determining a mechanical load on each vibration transducer in the array. However, other configurations and processes may also be possible for determining a mechanical load. For example, in one embodiment, each transducer in the array may be driven by a separate amplifier. Such a configuration may allow for another form of sensing that involves monitoring the amount of current flowing through each transducer when a mechanical load is applied. In particular, this configuration may involve a determination of how much current is consumed by each individual amplifier. In other words, when a mechanical load is applied to a transducer, an electrical output may be generated. The generated electrical output may then be consumed by the amplifier. Therefore, a change in power or current flow into the amplifier may be used to track the electrical output of the transducer.

In another embodiment, all transducers in the array may be driven by a single amplifier. Such a configuration may involve connecting the transducers in parallel. Note, however, that any combination of the embodiments described herein may be used. For example, a linear array of 4 transducers may include 3 transducers driven by a single amplifier and the remaining transducer driven by a separate amplifier. Other examples and combinations may also be possible.

In some cases, sensing techniques may involve a sensor such as a capacitive touch pad. A capacitive touch pad may be used in a situation where a transducer is unable to operate as a pressure sensor. In this case, the capacitive touch pad may be placed adjacent to the transducer to assist with determination of the quality of contact. Other sensing techniques may also be possible.

B. Determining a Respective Power Level for Each Vibration Transducer

At block 404, method 400 involves, based at least in part on the one or more determined mechanical loads, determining a respective power level for each vibration transducer in the array.

In one example, as mentioned above, logic elements 508A-D may be configured to recognize mechanical loads (i.e., a quality of contact) on transducers 306A-D, respectively. For instance, sensors 506A-D may be connected to the transducers 306A-D for purposes of monitoring, by logic elements 508A-D, the electrical output produced by the transducers as a result of mechanical loads on the transducers.

Regardless of the sensing technique, each transducer may be determined as either having (1) good contact, (2) partial contact, or (3) no contact. Such a determination may be based on predetermined thresholds exceeded while sensing the quality of contact. Once the quality of contact has been determined for the array of transducers 304, logic elements 508A-D may be used to properly allocate energy (e.g., the levels of sound vibration) among the transducers.

More specifically, the amount of current (e.g., energy or power) applied to drive each transducer in the array 304 may be based on the determination of quality of contact as described above. In particular, logic may be implemented within the logic elements 508A-D to apply the most current to the transducer(s) determined to have good contact. Lesser current may be applied to transducer(s) determined to have partial contact, and transducer(s) determined to have no contact may be deactivated. To illustrate, once the power level is determined for each transducer by the logic elements 508A-D, the logic elements 508A-D may send commands to switches 510A-D, respectively, in order to apply an adjustment of the power level for each transducer 306A-D.

For example, consider the array 304 that includes transducers 306A-D capable of the sensing techniques described herein. As discussed above in association with FIG. 3B, transducer 306A may be considered as having partial contact with bone structure 308. On the other hand, transducers 306B and 306C may be considered as having good contact with bone structure 308. Additionally, transducer 306D may be considered as having no contact with bone structure 308. As mentioned above, such determination of quality of contact may be carried out by logic elements 508A-D.

While transducers 306B and 306C are both considered to have good contact, a determination can be made, for example, that the quality of contact for transducer 306B is better than the quality of contact for transducer 306C. Therefore, the highest respective power level will be applied to transducer 306B, followed by transducer 306C, and then transducer 306A. Transducer 306D may be temporarily deactivated as long as the determination of 'no contact' is maintained. Other examples may also be possible.

Note that the process of sensing and responsively allocating energy in the array 304 may occur repeatedly and frequently. For instance, the process may take place every few milliseconds as long as the HMD is turned on. Alternatively, the process may only take place at a time when the HMD is configured to send the audio signal 502 to one or more of transducers 306A-D. Further, note that the relationship between the amount of energy applied to a transducer and the quality of contact of the transducer may take any form (e.g., linear, exponential etc.)

Yet further, note that methods and systems described herein may be useful for adapting an array of piezoelectric transducers, placed on a head-mounted device (HMD), to different head sizes. However, additional advantages of the invention may include: minimizing the acoustic leak to the environment, optimizing the use of energy allocated to the array, and making use of the sensing capabilities for additional applications, among other possibilities.

V. Conclusion

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A head-mountable device comprising:
a support structure;
an array of vibration transducers arranged on the support structure, wherein one or more of the vibration transducers are each configured to sense mechanical load on the vibration transducer;
at least one amplifier configured to transmit power to the array of vibration transducers; and
a control system configured to:
determine a respective mechanical load on each of one or more of the vibration transducers; and
based at least in part on the one or more determined mechanical loads, determine a respective power level for each vibration transducer in the array.

2. The head-mountable device of claim 1, wherein the one or more vibration transducers that are configured to sense mechanical load comprise at least a first and a second vibration transducer from the array, wherein the control system is configured to:
determine a first mechanical load on the first vibration transducer;
determine a second mechanical load on the second vibration transducer; and
based at least in part on the first and the second mechanical loads, determine both a first power level for the first vibration transducer and a second power level for the second vibration transducer.

3. The head-mountable device of claim 2, wherein the control system is further configured to:
cause the first vibration transducer to operate at the first power level; and
cause the second vibration transducer to operate at the second power level.

4. The head-mountable device of claim 2, wherein the one or more vibration transducers that are configured to sense mechanical load further comprise at least a third vibration transducer from the array, wherein the control system is further configured to:
determine that no mechanical load is applied on the third vibration transducer; and
based on the determination that no mechanical load is applied on the third vibration transducer, deactivate the third vibration transducer.

5. The head-mountable device of claim 1, wherein the vibration transducers are bone conduction transducers (BCTs).

6. The head-mountable device of claim 1, wherein the vibration transducers are arranged such that one or more of the vibration transducers vibrationally couple to a bone structure of a wearer when the head-mountable device is worn.

7. The head-mountable device of claim 1, wherein the array of vibration transducers is attached to an inner wall of at least one side section of the support structure.

8. The head-mountable device of claim 1, wherein the array of vibration transducers is a linear array.

9. The head-mountable device of claim 1, wherein the array of vibration transducers comprises at least two vibration transducers.

10. The head-mountable device of claim 1, wherein sensing a mechanical load comprises detecting a quantity of pressure on the vibration transducer.

11. The head-mountable device of claim 10, wherein sensing a mechanical load further comprises sensing an electrical output produced by the vibration transducer, wherein the electrical output is correlated with the quantity of pressure.

12. The head-mountable device of claim 11, wherein sensing an electrical output comprises one or more of: (a) impedance monitoring, (b) voltage monitoring, and (c) current monitoring.

13. The wearable-computing system of claim 1, wherein transmitting power to the array of vibration transducers comprises driving a vibration transducer with a small inaudible signal at a resonant frequency of the vibration transducer.

14. A method comprising:
determining a respective mechanical load on each of one or more vibration transducers from an array of vibration transducers that is arranged on a support structure of a head-mountable device, wherein the one or more of the vibration transducers from the array are each configured to sense mechanical load on the vibration transducer, wherein the head-mountable device comprises at least one amplifier configured to transmit power to the array of vibration transducers; and
based at least in part on the one or more determined mechanical loads, determining a respective power level for each vibration transducer in the array.

15. The method of claim 14, wherein the one or more vibration transducers that are configured to sense mechanical load comprise at least a first and a second vibration transducer from the array, wherein the method further comprises:
determining a first mechanical load on the first vibration transducer;
determining a second mechanical load on the second vibration transducer; and
based at least in part on the first and the second mechanical loads, determining both a first power level for the first vibration transducer and a second power level for the second vibration transducer.

16. The method of claim 15, further comprising:
causing the first vibration transducer to operate at the first power level; and
causing the second vibration transducer to operate at the second power level.

17. The method of claim 15, wherein the one or more vibration transducers that are configured to sense mechanical load further comprise at least a third vibration transducer from the array, wherein method further comprises:
determining that no mechanical load is applied on the third vibration transducer; and
based on the determination that no mechanical load is applied on the third vibration transducer, deactivating the third vibration transducer.

18. The method of claim 14, wherein the vibration transducers are bone conduction transducers (BCTs).

19. The method of claim 14, wherein the array of vibration transducers is a linear array.

20. A non-transitory computer readable medium having stored therein instructions executable by a computing device to cause the computing device to perform functions comprising:

determining a respective mechanical load on each of one or more vibration transducers from an array of vibration transducers that is arranged on a support structure of a head-mountable device, wherein the one or more of the vibration transducers from the array are each configured to sense mechanical load on the vibration transducer, wherein the head-mountable device comprises at least one amplifier configured to transmit power to the array of vibration transducers; and based at least in part on the one or more determined mechanical loads, determining a respective power level for each vibration transducer in the array.

\* \* \* \* \*